Patented Sept. 17, 1935

2,014,867

UNITED STATES PATENT OFFICE 2,014,867

PROCESS FOR PURIFYING PYRIDINES

Walther Schrauth, Berlin-Grunewald, Germany, assignor to The Hydronapthene Corporation, Wilmington, Del., a corporation of Delaware No Drawing. Application August 31, 1929, Serial No. 389,859. In Germany June 19, 1929

8 Claims. (Cl. 260—42)

This invention relates to a process for hydrogenizing pyridines.

Various attempts have been made to convert pyridine and its homologues into piperidines by catalytic hydrogenization. However, from the existing publications it appears that in this way piperidines could only be obtained by means of precious catalysts (platinum, palladium), see J. Houben's "Methods of organic chemistry", 1925, vol II, pages 339, 483, 484, 510, and that when employing non-precious catalysts such as nickel, cobalt, copper &c. amines and, in some cases, hydrocarbons were produced (loc. cit., pages 339 and 484).

Now I have found that the catalytic conversion of pyridine and its homologues into piperidines can be carried out even by means of non-precious catalysts when prerefining the material to be hydrogenized which prerefinement substantially consists in treating the said material at elevated temperatures with essentially basic substances such as copper oxide, zinc oxide, lead oxide, calcium oxide or the like in the presence or absence of hydrogen or gases containing hydrogen. However these refining agents should contain at least two of the above-named substances simultaneously in the ratio of 1:1 or 1:2. For instance, they may consist of copper oxide + zinc oxide or copper oxide + calcium oxide or lead oxide + copper oxide.

The refinement is preferably carried out by treating the pyridine or its homologues for some hours with some percent (5 to 10%, according to the degree of contamination) of the above-named mixtures of oxides, in presence of hydrogen under pressure at temperatures between 150 and 350° C. with vehement stirring, and then subjecting the mass to distillation.

The refining material which is left as a residue may be used anew, preferably after having been regenerated by calcining. The distillate consisting of refined pyridine is then subjected to catalytic hydrogenization by means of a finely distributed contact mass as nickel, cobalt, copper or mixtures of such catalytic metals.

At temperatures between 100 and 250° C. the absorption of hydrogen rapidly takes place even under a slight hydrogen pressure and piperidine or its homologues are obtained with satisfactory yields.

The reaction products are separated from the contact mass in the usual way by distillation or filtration. They represent colorless, strongly basic liquids which may be utilized for various purposes, such as, for instance, in the textile or rubber industry, in the manufacture of pharmaceutical preparations, as solvents or the like.

I claim:—

1. The process of purifying pyridines which comprises heating the same at elevated temperatures in the presence of basic metal oxides.

2. The process of purifying pyridines which comprises heating the same at temperatures from about 150 to about 350° C. in the presence of basic metal oxides.

3. The process of purifying pyridines which comprises treating the same with hydrogen at temperatures from about 150 to about 350° C. in the presence of basic metal oxides.

4. The process of purifying pyridines which comprises treating the same with hydrogen at temperatures from about 150 to about 350° C. in the presence of at least two basic metal oxides.

5. The process of purifying pyridines which comprises heating the same at temperatures from about 150 to about 350° C. in the presence of copper and zinc oxides.

6. The process of purifying pyridines which comprises heating the same at temperatures from about 150 to about 350° C. in the presence of copper and calcium oxides.

7. The process of purifying pyridines which comprises heating the same at temperatures from about 150 to about 350° C. in the presence of copper and lead oxides.

8. The process of purifying pyridines which comprises heating the same for some hours at a temperature of from about 150 to about 300° C. in the presence of basic metal oxides and separating the purified pyridine from the oxides.

WALTHER SCHRAUTH.